United States Patent
Maeshima

(10) Patent No.: US 9,998,048 B2
(45) Date of Patent: Jun. 12, 2018

(54) MOTOR CONTROL APPARATUS FOR VECTOR-CONTROLLING SENSORLESS MOTOR

(71) Applicant: CANON KABUSHIKI KAISHA, Tokyo (JP)

(72) Inventor: Yoko Maeshima, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 14/695,199

(22) Filed: Apr. 24, 2015

(65) Prior Publication Data
US 2015/0318804 A1 Nov. 5, 2015

(30) Foreign Application Priority Data

May 2, 2014 (JP) .................................. 2014-095507

(51) Int. Cl.
*H02P 21/00* (2016.01)
*G05B 1/02* (2006.01)
(Continued)

(52) U.S. Cl.
CPC ............. *H02P 21/14* (2013.01); *H02P 6/12* (2013.01); *H02P 6/28* (2016.02); *H02P 21/26* (2016.02); *H02P 25/089* (2016.02)

(58) Field of Classification Search
CPC .. H02P 6/002; H02P 6/12; H02P 21/14; H02P 21/26
(Continued)

(56) References Cited

U.S. PATENT DOCUMENTS

| 6,646,409 | B2 * | 11/2003 | Won ...................... H02P 25/089 318/606 |
| 6,788,024 | B2 | 9/2004 | Kaneko et al. |

(Continued)

FOREIGN PATENT DOCUMENTS

| CN | 101098121 A | 1/2008 |
| CN | 101567652 A | 10/2009 |

(Continued)

OTHER PUBLICATIONS

Chinese Office Action dated Jul. 26, 2017, in related Chinese Patent Application No. 201510205410.4 (with English translation).

(Continued)

*Primary Examiner* — Bentsu Ro
*Assistant Examiner* — Zemenay Truneh
(74) *Attorney, Agent, or Firm* — Fitzpatrick, Cella, Harper & Scinto

(57) ABSTRACT

A motor control apparatus that vector-controls a sensorless motor includes an estimating unit configured to obtain an estimated phase value by estimating a phase of a rotor in the sensorless motor, and a generating unit configured to generate, from the estimated phase value and a phase command value of the rotor, a phase conversion value that is used for a coordinate conversion between a rotary coordinate system and a static coordinate system in the vector control. The generating unit is further configured to output the phase command value as the phase conversion value when the rotor is caused to start to rotate, and change the phase conversion value so that the phase conversion value approaches the estimated phase value from a predetermined timing after the rotor is caused to start to rotate.

20 Claims, 7 Drawing Sheets

(51) Int. Cl.
  *H02P 21/14* (2016.01)
  *H02P 6/12* (2006.01)
  *H02P 21/26* (2016.01)
  *H02P 6/28* (2016.01)
  *H02P 25/089* (2016.01)

(58) Field of Classification Search
  USPC .................................................. 318/400.02
  See application file for complete search history.

(56) References Cited

U.S. PATENT DOCUMENTS

| | | | |
|---|---|---|---|
| 7,638,967 B2 * | 12/2009 | Aizawa | H02P 21/34 318/400.02 |
| 7,932,691 B2 | 4/2011 | Son et al. | |
| 8,310,182 B2 | 11/2012 | Nomura | |
| 8,878,480 B2 | 11/2014 | Iwaji et al. | |
| 9,000,695 B2 * | 4/2015 | Kwon | H02P 21/0039 318/400.02 |
| 2003/0025475 A1 | 2/2003 | Won et al. | |
| 2004/0051495 A1 | 3/2004 | Kaneko et al. | |

FOREIGN PATENT DOCUMENTS

| | | |
|---|---|---|
| CN | 101682283 A | 3/2010 |
| CN | 102171923 A | 8/2011 |
| CN | 102969951 A | 3/2013 |
| CN | 103326641 A | 9/2013 |
| JP | 2004-112898 A | 4/2004 |
| JP | 2010206874 A | 9/2010 |
| JP | 2011-193568 A | 9/2011 |
| JP | 2012-130100 A | 7/2012 |
| JP | 5466478 B2 | 4/2014 |

OTHER PUBLICATIONS

Japanese Office Action issued in corresponding Japanese Application No. 2014095507 dated Mar. 2, 2018.

* cited by examiner

US 9,998,048 B2

MOTOR CONTROL APPARATUS FOR VECTOR-CONTROLLING SENSORLESS MOTOR

BACKGROUND OF THE INVENTION

Field of the Invention

The present disclosure relates to motor control apparatuses that control sensorless motors.

Description of the Related Art

Japanese Patent Laid-Open No. 2012-130100 discloses a motor control apparatus for a sensorless motor in which a phase sensor, such as a Hall sensor, that detects the phase of the rotor is not used in motor control. Motor control apparatuses for sensorless motors find the phase of the rotor from a voltage applied to the motor and a coil current.

Because the phase of the rotor is found from a voltage applied to the motor and a coil current in a sensorless motor, the phase of the rotor cannot be detected when the rotor is stopped, for example. As such, in a sensorless motor, forced driving that drives the motor is carried out using a synchronization signal of a predetermined frequency until the phase of the rotor can be detected, and the driving is then switched to normal sensorless driving, or in other words, stationary driving. In sensorless motors, there is demand for stability in the rotation of the rotor during such transitions.

SUMMARY OF THE INVENTION

According to an aspect of the present invention, a motor control apparatus that vector-controls a sensorless motor, includes: an estimating unit configured to obtain an estimated phase value by estimating a phase of a rotor in the sensorless motor; and a generating unit configured to generate, from the estimated phase value and a phase command value of the rotor, a phase conversion value that is a phase difference between a rotary coordinate system and a static coordinate system in the vector control. The generating unit is further configured to output the phase command value as the phase conversion value when the rotor is caused to start to rotate, and change the phase conversion value so that the phase conversion value approaches the estimated phase value from a predetermined timing after the rotor is caused to start to rotate.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings. Note that the following embodiments are to be taken as examples only, and the present invention is not intended to be limited by the embodiments. Note also that constituent elements not necessary for the descriptions of the embodiments have been omitted from the drawings.

First Embodiment

Figure 1:
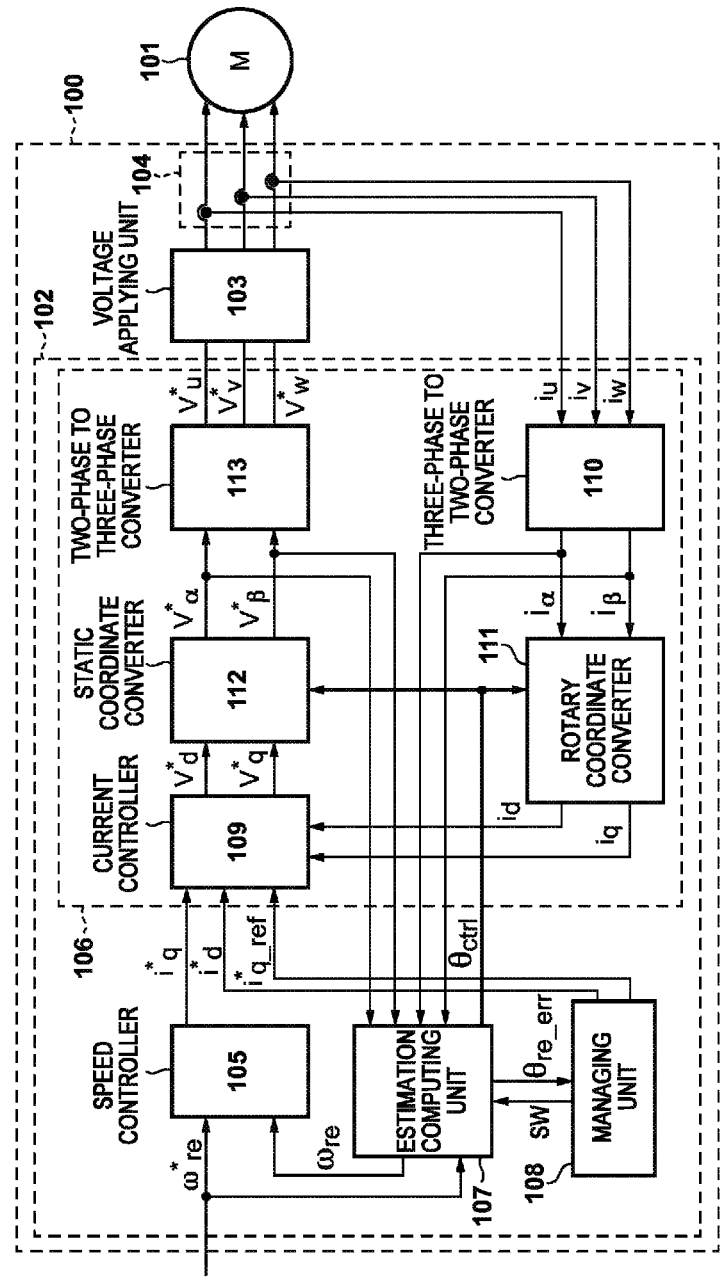
FIG. 1 is a schematic diagram illustrating a motor control apparatus according to an embodiment.

FIG. 1 is a schematic diagram illustrating a motor control apparatus 100 that vector-controls a sensorless motor, according to the present embodiment. The motor control apparatus 100 applies a voltage for driving a DC brushless motor 101 (called simply a "motor 101" hereinafter) to the motor 101 in response to a speed command value $\omega^*_{re}$ that has been input. A current detecting unit 104 measures currents flowing through U, V, and W phases of the motor 101 and outputs a U phase current value $i_u$, a V phase current value $i_v$, and a W phase current value $i_w$, which are current measurement values, to a motor control unit 102. Based on the speed command value $\omega^*_{re}$ and the U phase current value $i_u$, the V phase current value $i_v$, and the W phase current value $i_w$ output from the current detecting unit 104, the motor control unit 102 outputs a U phase current operation amount $V^*_u$, a V phase current operation amount $V^*_v$, and a W phase current operation amount $V^*_w$ to a voltage applying unit 103. Note that in the following descriptions, "current operation amount" refers to a voltage command value indicating a voltage to be applied. The voltage applying unit 103 applies a voltage to the motor 101 based on the respective phase current operation amounts. Note that the current detecting unit 104 may be configured to detect currents of two given phases and calculate the current value of the remaining phase through a computation process. The motor control unit 102 can be realized by causing a processor (a CPU) to execute a corresponding program. However, the motor control unit 102 can also be realized using an FPGA, a custom LSI, or the like, and can also be realized by combining two or more of a processor, an FPGA, a custom LSI, or the like.

The configuration of the motor control unit 102 will be described next. A managing unit 108 manages sequences of the motor control unit 102, and controls operations of a speed controller 105, a current control unit 106, and an estimation computing unit 107. A three-phase to two-phase converter 110 of the current control unit 106 carries out a coordinate conversion process on the U phase current value $i_u$, the V phase current value $i_v$, and the W phase current value $i_w$ detected by the current detecting unit 104, and obtains an $\alpha$ axis current value $i_\alpha$ and a $\beta$ axis current value $i_\beta$. Note that the $\alpha$-$\beta$ axis is a static coordinate system. For example, the $\alpha$ axis can be taken as one of the phase directions, such as the U phase direction, and the $\beta$ axis can be taken as a direction orthogonal to the $\alpha$ axis. A rotary coordinate converter 111 finds a d axis current value $i_d$ and a q axis current value $i_q$ from the $\alpha$ axis current value $i_\alpha$ and the $\beta$ axis current value $i_\beta$ by carrying out a coordinate conversion process. Note that the d-q axis is a rotary coordinate system. For example, the d axis can be taken as a predetermined direction of the rotor, such as an N-pole direction, and the q axis can be taken as a direction orthogonal to the d axis. Note that in the coordinate conversion process, the rotary coordinate converter 111 uses the phase conversion values output by the estimation computing unit 107, or in other words, a coordinate-converted phase $\theta_{ctrl}$ indicating a phase difference between the $\alpha$ axis and the d axis.

The speed controller 105 determines and outputs a q axis current command value $i^*_q$ for adjusting the speed of the motor 101, based on the speed command value $\omega^*_{re}$ and an estimated speed $\omega_{re}$ of the rotor of the motor 101 output by the estimation computing unit 107. Based on the q axis current command value $i^*_q$, the d axis current value $i_d$ and q axis current value $i_q$, and a d axis current command value $i^*_d$ from the managing unit 108, a current controller 109 finds a d axis current operation amount $V^*_d$ and a q axis current operation amount $V^*_q$ and outputs these amounts to a static coordinate converter 112. The static coordinate converter 112 obtains an α axis current operation amount $V^*_α$ and a β axis current operation amount $V^*_β$ from the d axis current operation amount $V^*_d$ and the q axis current operation amount $V^*_q$ by carrying out a coordinate conversion process based on the coordinate-converted phase $θ_{ctrl}$ from the estimation computing unit 107. A two-phase to three-phase converter 113 finds the U phase current operation amount $V^*_u$, the V phase current operation amount $V^*_v$, and the W phase current operation amount $V^*_w$, and outputs these to the voltage applying unit 103, by carrying out a coordinate conversion process on the α axis current operation amount $V^*_α$ and the β axis current operation amount $V^*_β$.

Figure 2:
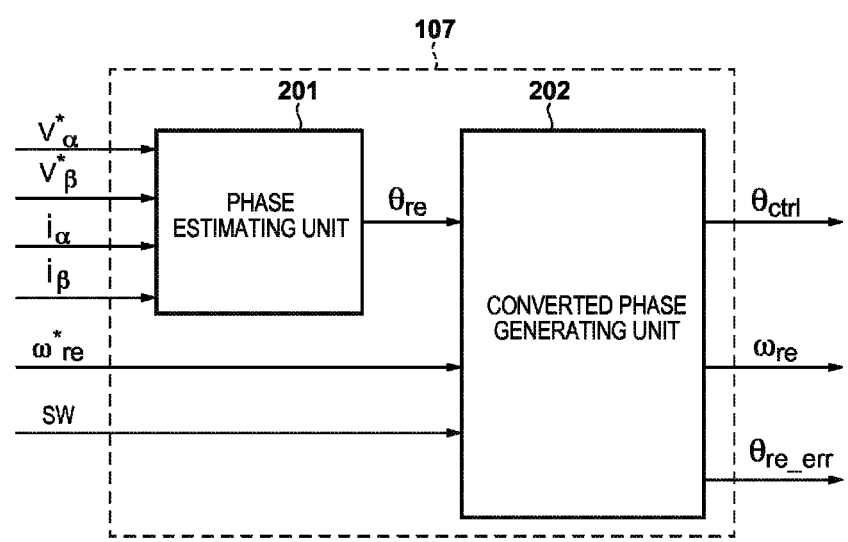
FIG. 2 is a schematic diagram illustrating an estimation computing unit according to an embodiment.

The estimation computing unit 107 finds and outputs the coordinate-converted phase $θ_{ctrl}$ and the estimated speed $ω_e$ from the α axis current operation amount $V^*_α$, the β axis current operation amount $V^*_β$, the α axis current value $i_α$, and the β axis current value $i_β$. FIG. 2 is a block diagram illustrating the estimation computing unit 107. A phase estimating unit 201 calculates, from the α axis current operation amount $V^*_α$, the β axis current operation amount $V^*_β$, the α axis current value $i_α$, and the β axis current value $i_β$, an estimated value of an induced voltage produced along the α axis and the β axis of the motor 101. An estimated phase value for the rotational phase of the rotor in the motor 101, or in other words, an estimated phase $θ_{re}$ that is an estimated value of a phase difference between the α axis and the d axis, is then calculated based on the estimated value of the induced voltage. Note that the phase estimating unit 201 may be configured to calculate the estimated phase $θ_{re}$ from the respective values in the d-q coordinate system rather than the α-β coordinate system. Furthermore, rather than estimating the phase from the estimated value of the induced voltage produced in the motor 101, a magnetic flux density may be estimated and the estimated phase may then be calculated from the estimated magnetic flux density.

Figure 3:
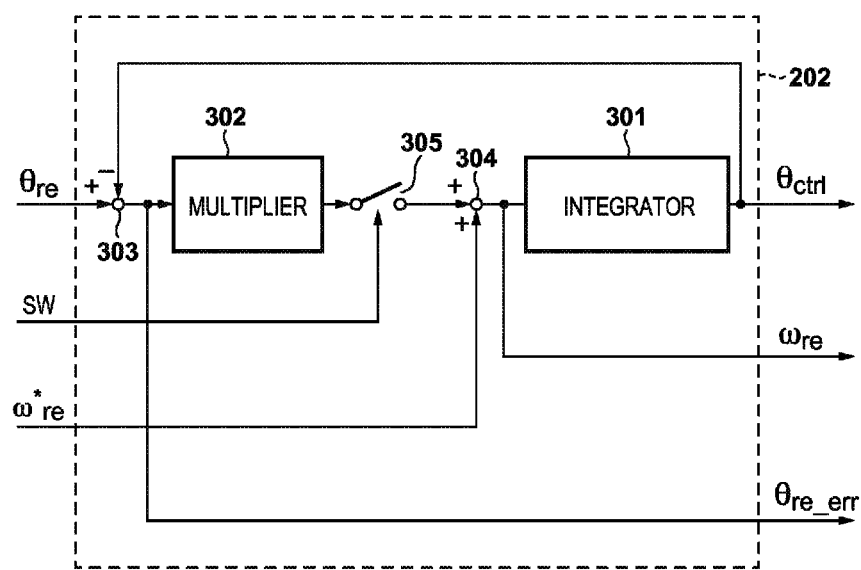
FIG. 3 is a schematic diagram illustrating a converted phase generating unit according to an embodiment.

FIG. 3 is a block diagram illustrating a converted phase generating unit 202 illustrated in FIG. 2. A switch 305 of the converted phase generating unit 202 is controlled on/off by a signal SW from the managing unit 108. As shown in FIG. 3, the switch 305 functions as a selecting unit that selects whether or not to enable an output from a multiplier 302 to be input into an adder 304. In the present embodiment, the switch 305 is off when the motor 101 is in a stopped state, and is switched on when the motor 101 begins to make a transition from a forced driving state to a stationary driving state. When the switch 305 is off, the converted phase generating unit 202 takes a value obtained by integrating the speed command value $ω^*_{re}$ using an integrator 301 as the coordinate-converted phase $θ_{ctrl}$, and outputs the speed command value $ω^*_{re}$ as the estimated speed $ω_{re}$. In other words, the coordinate-converted phase $θ_{ctrl}$ and the estimated speed $ω_{re}$ are respectively calculated through the following formulae.

$$θ_{ctrl} = ω^*_{re}/s \tag{1}$$

$$ω_{re} = ω^*_{re} \tag{2}$$

Note that s in the above formula is a Laplace operator.

The value obtained by integrating the speed command value $ω^*_{re}$ is also a phase command value for the motor 101.

Accordingly, when the switch 305 is off, the coordinate-converted phase $θ_{ctrl}$ matches the phase command value. In the present embodiment, a subtractor 303 and the multiplier 302 function as an error calculating unit, and output a value obtained by multiplying an estimated phase error $θ_{re\_err}$, which is a difference between the estimated phase $θ_{re}$ and the coordinate-converted phase $θ_{ctrl}$, by a predetermined coefficient. Specifically, the subtractor 303 finds and outputs the estimated phase error $θ_{re\_err}$, which is the difference between the estimated phase $θ_{re}$ and the coordinate-converted phase $θ_{ctrl}$. The multiplier 302 outputs a value obtained by multiplying the estimated phase error $θ_{re\_err}$ by a gain K. Note that the gain K is set by the managing unit 108. Accordingly, when the switch 305 is on, the adder 304 adds the speed command value $ω^*_{re}$ and the value obtained by multiplying the estimated phase error $θ_{re\_err}$ by the predetermined gain K. In this case, the converted phase generating unit 202 integrates, via the integrator 301, the sum of the speed command value $ω^*_{re}$ and the value obtained by multiplying the estimated phase error $θ_{re\_err}$ by the predetermined gain K, and outputs the integrated value as the coordinate-converted phase $θ_{ctrl}$. Accordingly, when the switch 305 is on, the converted phase generating unit 202 functions so as to cause the coordinate-converted phase $θ_{ctrl}$ to match the estimated phase $θ_{re}$. The coordinate-converted phase $θ_{ctrl}$ and the estimated speed $ω_{re}$ when the switch 305 is on are respectively calculated through the following formulae.

$$θ_{ctrl} = K·θ_{re}/(s+K) + (s/(s+K))·(ω^*_{re}/s) \tag{3}$$

$$ω_{re} = sK·θ_{re}/(s+K) + (s/(s+K))·(ω^*_{re}/s) \tag{4}$$

Note that s in the above formula is a Laplace operator.

In this manner, when the switch 305 is on, the coordinate-converted phase $θ_{ctrl}$ gradually approaches the estimated phase $θ_{re}$ at a speed based on the gain K. Note that the multiplier 302 can be omitted in the case where the gain K is 1. Meanwhile, the estimated speed $ω_{re}$ may be found by differentiating the estimated phase $θ_{re}$.

Figure 4:
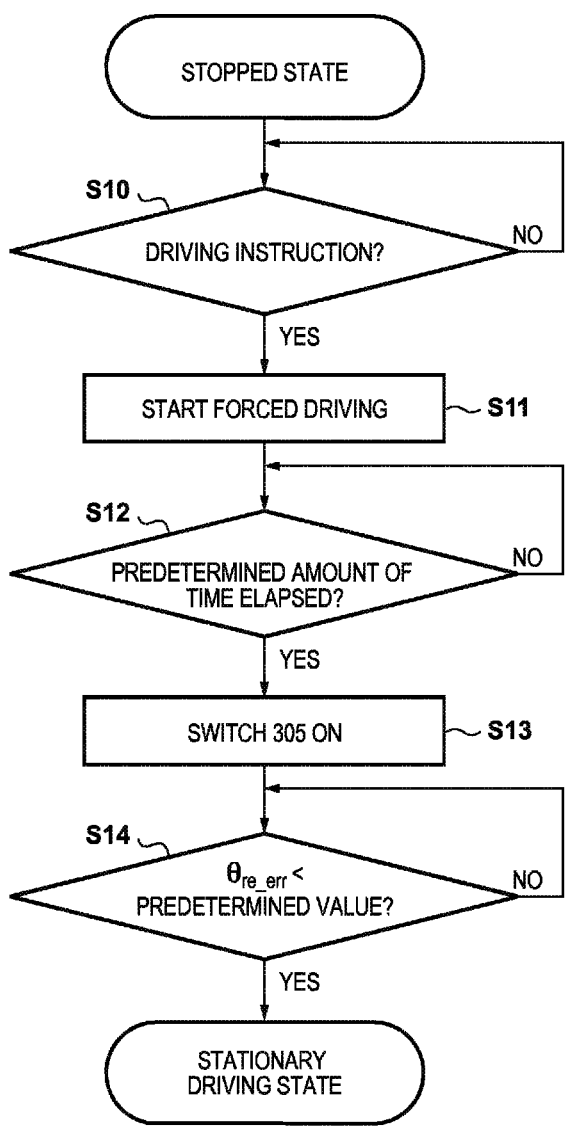
FIG. 4 is a flowchart illustrating operations when a motor is started according to an embodiment.

FIG. 4 is a flowchart illustrating control executed by the motor control unit 102 at the start of driving of the motor 101. In S10, the motor control unit 102 stands by until a driving instruction is received from the managing unit 108. Upon receiving the driving instruction, the motor control unit 102 issues driving instructions to the respective units in the motor control unit 102. As a result, the current control unit 106 starts forced driving of the motor 101. After the start of the forced driving, the motor control unit 102 stands by in S12 until a predetermined amount of time has elapsed, and once the predetermined amount of time has elapsed, in S13, the motor control unit 102 outputs the signal SW and switches the switch 305 from off to on. As described earlier, when the switch 305 is on, the coordinate-converted phase $θ_{ctrl}$ gradually approaches the estimated phase $θ_{re}$ at a speed based on the gain K. In S14, the motor control unit 102 monitors the estimated phase error $θ_{re\_err}$, which is the difference between the coordinate-converted phase $θ_{ctrl}$ and the estimated phase $θ_{re}$, and stands by until the estimated phase error $θ_{re\_err}$ drops below a predetermined value. The motor control unit 102 transitions to stationary driving once the estimated phase error $θ_{re\_err}$ drops below the predetermined value.

Figure 5:
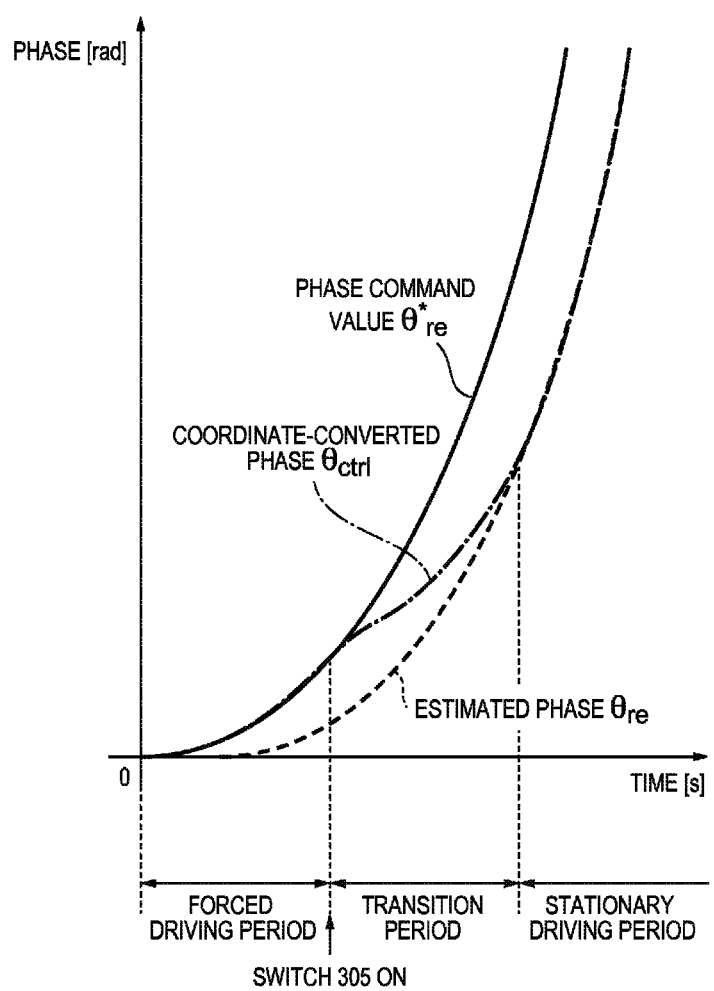
FIG. 5 is a graph illustrating a change in a coordinate-converted phase according to an embodiment.

FIG. 5 is a graph illustrating changes in the coordinate-converted phase $θ_{ctrl}$ from the stopped state to the transition to stationary driving. From when forced driving is started in S11 to when the switch 305 turns on in S13, the coordinate-converted phase $θ_{ctrl}$ matches the phase command value $θ^*_{re}$ obtained by integrating the speed command value $\omega^*_{re}$. Here, the period spanning until the switch 305 turns on will be called a "forced driving period". As described earlier, when the switch 305 is on, the coordinate-converted phase $\theta_{ctrl}$ gradually approaches the estimated phase $\theta_{re}$ at a speed based on the gain K. In other words, even if the switch 305 is on, the coordinate-converted phase $\theta_{ctrl}$ does not reach the estimated phase $\theta_{re}$ in a single change. Due to the gain K, the coordinate-converted phase $\theta_{ctrl}$ undergoes multiple changes, and can gradually approach the estimated phase $\theta_{re}$ as a result. When the estimated phase error $\theta_{re\_err}$ drops below the predetermined value, reaching approximately 0, for example, the motor control unit 102 transitions to stationary driving. Here, the period spanning from when the switch 305 turns on to when the estimated phase error $\theta_{re\_err}$ drops below the predetermined value will be called a "transitional period", and a period following thereafter will be called a "stationary driving period".

Note that in the forced driving period, the speed controller 105 carries out current control based on the q axis current command value $i^*_{q\_ref}$ output by the managing unit 108 instead of the q axis current command value $i^*_q$, as open-loop control. Note also that the timing at which to change the q axis current command value $i^*_{q\_ref}$ to the q axis current command value $i^*_q$ can be set to the time of the transition to the stationary driving period. Details of the forced driving are not essential to the present embodiment, and thus detailed descriptions thereof will be omitted. Note that the forced driving can also undergo feed-forward control based on the characteristics of the motor 101, for example. Meanwhile, in the stationary driving period, the estimated phase $\theta_{re}$ may be output as-is as the coordinate-converted phase $\theta_{ctrl}$. Furthermore, although the flowchart in FIG. 4 indicates the switch 305 turning on when a predetermined amount of time passes or elapses, the switch 305 can also be turned on at the timing at which the estimated phase $\theta_{re}$ reaches a predetermined value, for example.

As described thus far, when transitioning from a forced driving state to a stationary driving state (a sensorless driving state), the coordinate-converted phase $\theta_{ctrl}$ is gradually caused to transition from the phase command value $\theta^*_{re}$ to the estimated phase $\theta_{re}$. This configuration enables highly-stable transitions. Furthermore, according to the present embodiment, complicated calculations are unnecessary, and thus the transition from the forced driving to the stationary driving state can be carried out without increasing costs.

Second Embodiment

Figure 6:
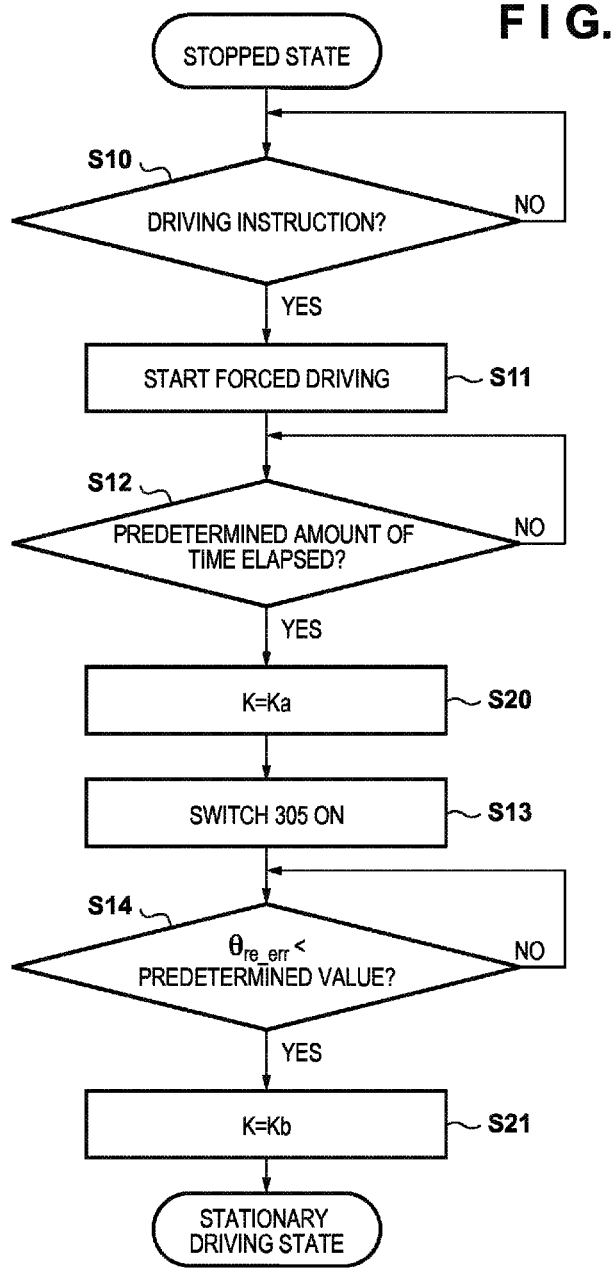
FIG. 6 is a flowchart illustrating operations when a motor is started according to an embodiment.

Next, a second embodiment will be described, focusing on the differences from the first embodiment. In the present embodiment, the gain K is varied between the forced driving and the stationary driving. FIG. 6 is a flowchart illustrating control executed by the motor control unit 102 according to the present embodiment. This flowchart differs from the flowchart in FIG. 4 in that the process of S20 is executed after S12 and the process of S21 is executed after S14. First, in the present embodiment, the value of the gain K is set to Ka when the switch 305 is turned on in S13. Then, when the estimated phase error $\theta_{re\_err}$ drops below the predetermined value in S14, the value of the gain K is set to Kb in S21. Note that the value Kb is a greater value than the value Ka. According to this configuration, the responsiveness of control during the stationary driving state can be increased.

Third Embodiment

Figure 7:
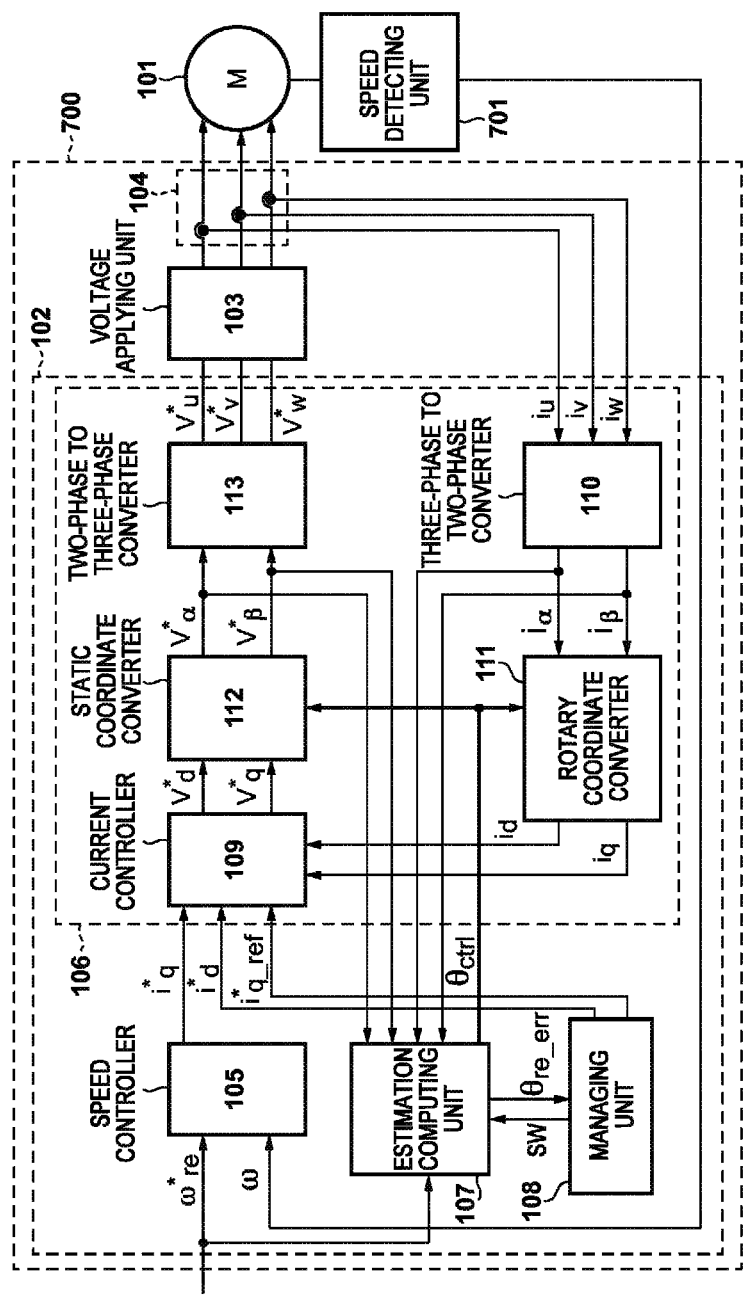
FIG. 7 is a schematic diagram illustrating a motor control apparatus according to an embodiment.

Next, a third embodiment will be described, focusing on the differences from the first embodiment. FIG. 7 is a schematic diagram illustrating a motor control apparatus 700 according to the present embodiment. The present embodiment differs from the first embodiment in that a speed detecting unit 701 that detects the speed of the motor 101 is provided, and the motor control apparatus 700 controls the speed based on the detected motor speed. In the present embodiment, the speed detecting unit 701 outputs an actual rotational speed $\omega$ of the rotor, and thus the speed controller 105 outputs the q axis current command value $i^*_q$ using the speed information $\omega$ rather than the estimated speed $\omega_e$ as in the first embodiment.

Other Embodiments

Embodiments of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095507, filed on May 2, 2014, which is hereby incorporated by reference herein in its entirety.

What is claimed is:

1. A motor control apparatus that vector-controls a sensorless motor, the apparatus comprising:
  an estimating unit configured to obtain an estimated phase value by estimating a phase of a rotor in the sensorless motor; and
  a generating unit including a switch and configured to generate, from the estimated phase value and a phase command value of the rotor, a phase conversion value that is used for a coordinate conversion between a rotary coordinate system and a static coordinate system in the vector control by setting the switch to an ON state,
  wherein the generating unit is further configured to output the phase command value as the phase conversion value by setting the switch to an OFF state when the rotor starts to rotate from a stopped state, and change the phase conversion value so that the phase conversion value approaches the estimated phase value from a predetermined timing after the rotor starts to rotate by setting the switch to the ON state.

2. The motor control apparatus according to claim 1, wherein the phase command value is obtained by integrating an input speed command value of the rotor.

3. The motor control apparatus according to claim 2, wherein the generating unit includes:
an error calculating unit configured to output a value based on a phase error that is a difference between the estimated phase value and the generated phase conversion value;
an adding unit configured to add the value output from the error calculating unit and the speed command value as an input;
an integrating unit configured to generate and output the phase conversion value by integrating a value output from the adding unit; and
a selecting unit configured to select whether or not to input the value output from the error calculating unit into the adding unit,
wherein the selecting unit is further configured to not input the value output from the error calculating unit into the adding unit when the rotor is caused to start to rotate, and input the value output from the error calculating unit into the adding unit from the predetermined timing.

4. The motor control apparatus according to claim 3, wherein the error calculating unit includes:
a subtracting unit configured to obtain the phase error; and
a multiplying unit configured to multiply the phase error by a predetermined coefficient and output a result to the selecting unit.

5. The motor control apparatus according to claim 4, further comprising:
a changing unit configured to change the predetermined coefficient to a higher value when the phase error drops below a predetermined value.

6. The motor control apparatus according to claim 3, further comprising:
a determining unit configured to determine, from the speed command value and a speed of the rotor, a current command value indicating a current flowing in the sensorless motor.

7. The motor control apparatus according to claim 6, wherein a value output from the adding unit is taken as the speed of the rotor.

8. The motor control apparatus according to claim 1, wherein the predetermined timing is a time at which a predetermined amount of time has elapsed after the rotor has been caused to start rotating.

9. The motor control apparatus according to claim 1, wherein the predetermined timing is a time at which the estimated phase value reaches a predetermined value.

10. The motor control apparatus according to claim 1, wherein the estimating unit is further configured to obtain the estimated phase value from a voltage command value applied to the sensorless motor and a current measurement value obtained by measuring a current flowing in the sensorless motor.

11. The motor control apparatus according to claim 1, wherein the generating unit is further configured to cause the phase conversion value to match the estimated phase value by changing the phase conversion value.

12. The motor control apparatus according to claim 1, wherein the generating unit is further configured to change the phase conversion value a plurality of times so that the phase conversion value approaches the estimated phase value.

13. The motor control apparatus according to claim 1, wherein the generating unit includes:
an error calculating unit configured to output a value based on a phase error that is a difference between the estimated phase value and the generated phase conversion value; and
an adding unit configured to add the value output from the error calculating unit and a speed command value of the rotor, and
wherein the switch connects the error calculating unit and the adding unit in the ON state, and disconnects the error calculating unit and the adding unit in the OFF state.

14. The motor control apparatus according to claim 13, wherein
the generating unit includes an integrating unit configured to generate and output the phase conversion value by integrating a value output from the adding unit;
the speed command value input to the adding unit is input to the integrating unit when the error calculating unit and the adding unit is disconnected by the switch; and
a value that is a sum of the speed command value input to the adding unit and the value output from the error calculating unit is input to the integrating unit when the error calculating unit and the adding unit are connected by the switch.

15. The motor control apparatus according to claim 14, wherein the error calculating unit includes:
a subtracting unit configured to obtain the phase error; and
a multiplying unit configured to multiply the phase error by a predetermined coefficient and output a result to the switch.

16. A motor control apparatus that vector-controls a motor, the apparatus comprising:
an estimating unit configured to obtain an estimated phase value by estimating a phase of a rotor in the motor; and
a generating unit configured to generate, from the estimated phase value and a phase command value of the rotor, a phase conversion value that is used for a coordinate conversion between a rotary coordinate system and a static coordinate system in the vector control,
wherein the generating unit includes:
an error calculating unit configured to output a value based on a phase error that is a difference between the estimated phase value and the generated phase conversion value;
an adding unit configured to add the value output from the error calculating unit and a speed command value of the rotor;
an integrating unit configured to generate and output the phase conversion value by integrating a value output from the adding unit; and
a selecting unit configured to select whether or not to input the value output from the error calculating unit into the adding unit.

17. The motor control apparatus according to claim 16, wherein the selecting unit is further configured to not input the value output from the error calculating unit into the adding unit when the rotor is caused to start to rotate, and input the value output from the error calculating unit into the adding unit from a predetermined timing after the rotor starts to rotate.

18. The motor control apparatus according to claim 16, wherein the error calculating unit includes:
   a subtracting unit configured to obtain the phase error; and
   a multiplying unit configured to multiply the phase error by a predetermined coefficient and output a result to the selecting unit.

19. The motor control apparatus according to claim 18, further comprising:
   a changing unit configured to change the predetermined coefficient to a higher value when the phase error drops below a predetermined value.

20. The motor control apparatus according to claim 16, wherein the generating unit is further configured to change the phase conversion value a plurality of times so that the phase conversion value approaches the estimated phase value.

* * * * *